United States Patent
Meguro et al.

(10) Patent No.: US 11,052,748 B2
(45) Date of Patent: Jul. 6, 2021

(54) CONTROLLING APPARATUS AND CONTROLLING METHOD OF HYBRID VEHICLE

(71) Applicants: SHINDENGEN ELECTRIC MANUFACTURING CO., LTD., Tokyo-to (JP); HONDA MOTOR CO., LTD., Tokyo-to (JP)

(72) Inventors: Takayuki Meguro, Saitama-ken (JP); Mitsuhiro Kimura, Saitama-ken (JP); Ryuichi Takao, Saitama-ken (JP); Isao Shokaku, Saitama-ken (JP)

(73) Assignees: SHINDENGEN ELECTRIC MANUFACTURING CO., LTD., Tokyo (JP); HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/094,188

(22) PCT Filed: Sep. 9, 2016

(86) PCT No.: PCT/JP2016/076713
§ 371 (c)(1),
(2) Date: Oct. 16, 2018

(87) PCT Pub. No.: WO2018/016085
PCT Pub. Date: Jan. 25, 2018

(65) Prior Publication Data
US 2019/0135102 A1    May 9, 2019

(30) Foreign Application Priority Data

Jul. 22, 2016  (JP) .............................. JP2016-144407

(51) Int. Cl.
*B60K 6/485*  (2007.10)
*B60W 20/00*  (2016.01)
(Continued)

(52) U.S. Cl.
CPC .............. *B60K 6/485* (2013.01); *B60L 50/13* (2019.02); *B60L 50/16* (2019.02); *B60W 10/06* (2013.01);
(Continued)

(58) Field of Classification Search
CPC ....... B60K 6/485; B60W 20/20; B60W 10/30; B60W 30/18027; B60W 10/26;
(Continued)

(56) References Cited

U.S. PATENT DOCUMENTS

2001/0020789 A1*  9/2001  Nakashima ............ B60K 6/365
                                                     290/40 C
2013/0231817 A1    9/2013  Werner et al.
2016/0046278 A1*  2/2016  Matsuzaki .......... B60W 10/103
                                                     701/22

FOREIGN PATENT DOCUMENTS

DE    10 2006 012384 A1    9/2007
JP          2000-205002 A    7/2000
(Continued)

OTHER PUBLICATIONS

Fukuda, "English_translation _JP2012182893A", Sep. 2012.*
(Continued)

*Primary Examiner* — Peter D Nolan
*Assistant Examiner* — Ashley L Redhead, Jr.
(74) *Attorney, Agent, or Firm* — Procopio, Cory, Hargreaves & Savitch LLP

(57) ABSTRACT

A controlling apparatus 1 according to an embodiment is a controlling apparatus of a hybrid vehicle 30 including a motor generator 3 that is mechanically connected to an internal combustion engine 2 and that can generate power in response to rotation of the internal combustion engine 2 and provide torque to the internal combustion engine 2, the controlling apparatus 1 including a rotation information (Continued)

acquiring unit 11 that acquires rotation information of the motor generator 3 with a higher resolution than rotation information of the internal combustion engine 2 and an assist determining unit 12 that makes a determination regarding the start assist by the motor generator 3 based on the rotation information of the motor generator 3.

9 Claims, 4 Drawing Sheets

(51) Int. Cl.
| | |
|---|---|
| *B60W 20/20* | (2016.01) |
| *B60L 50/13* | (2019.01) |
| *B60W 10/06* | (2006.01) |
| *B60W 10/08* | (2006.01) |
| *B60W 10/30* | (2006.01) |
| *B60L 50/16* | (2019.01) |
| *B60W 30/18* | (2012.01) |
| *B60W 10/26* | (2006.01) |

(52) U.S. Cl.
CPC ............ *B60W 10/08* (2013.01); *B60W 10/26* (2013.01); *B60W 10/30* (2013.01); *B60W 20/00* (2013.01); *B60W 20/20* (2013.01); *B60W 30/18027* (2013.01); *B60W 2420/50* (2013.01); *B60W 2510/0638* (2013.01); *B60W 2510/0657* (2013.01); *B60W 2510/0666* (2013.01); *B60W 2510/081* (2013.01); *B60W 2510/083* (2013.01); *B60W 2540/10* (2013.01); *B60W 2540/12* (2013.01); *B60W 2710/081* (2013.01); *B60W 2710/083* (2013.01); *B60W 2710/086* (2013.01); *Y02T 10/62* (2013.01); *Y02T 10/7072* (2013.01)

(58) Field of Classification Search
CPC ...... B60W 10/06; B60W 10/08; B60W 20/00; B60W 2540/10; B60W 2710/081; B60W 2710/083; B60W 2510/081; B60W 2510/0638; B60W 2510/0657; B60W 2540/12; B60W 2510/083; B60W 2510/0666; B60W 2420/50; B60W 2710/086; B60L 50/16; B60L 50/13; Y02T 10/6226; Y02T 10/7077
See application file for complete search history.

(56) References Cited

FOREIGN PATENT DOCUMENTS

| | | | |
|---|---|---|---|
| JP | 2001106159 A | * | 4/2001 |
| JP | 2002252904 A | * | 9/2002 |
| JP | 2003-35361 A | | 2/2003 |
| JP | 2005-006469 A | | 1/2005 |
| JP | 2005-23886 A | | 1/2005 |
| JP | 2007022244 A | * | 2/2007 |
| JP | 2012182893 A | * | 9/2012 |
| JP | 2013-226939 A | | 11/2013 |
| JP | 2013-249032 A | | 12/2013 |
| WO | 2015/146772 A1 | | 10/2015 |

OTHER PUBLICATIONS

Araki, "English_translation _JP-2002252904A", Sep. 2002.*
Tagami, "English_translation _JP2001106159A", Apr. 2001.*
Hijikata, "English_translation _JP2007022244A", Feb. 2007.*
International Search Report for corresponding application No. PCT/JP2016/076713, dated Nov. 29, 2016, in 2 pages.
Extended European Search Report for related EP Patent Application No. 16909560.1, dated Aug. 2, 2019, in 10 pages.
Office Action for related IN Patent Application No. 201717046098 dated Jun. 12, 2020 in 6 pages.

* cited by examiner

CONTROLLING APPARATUS AND CONTROLLING METHOD OF HYBRID VEHICLE

TECHNICAL FIELD

The present invention relates to a controlling apparatus and a controlling method of a hybrid vehicle.

BACKGROUND ART

There is a conventionally known hybrid vehicle including an internal combustion engine (engine) and an electric motor (motor) as power sources. In the hybrid vehicle, the electric motor is provided as a motor generator in some cases. The motor generator can provide torque to the internal combustion engine to assist the internal combustion engine and can also generate power during running based on the internal combustion engine.

Furthermore, a vehicle such as a two-wheeled vehicle is conventionally provided with an alternating current generator (Alternating Current Generator: ACG) that is connected to a crankshaft of an internal combustion engine and that generates power in response to rotation of the internal combustion engine. Alternating current power generated by the alternating current generator is converted by a regulator rectifier (REG/RECT) into direct current power corresponding to a battery and then supplied to the battery.

In Patent Literature 1, a controlling apparatus of a hybrid vehicle is described, the controlling apparatus intended to improve driving force characteristics of starting or running, while securing regeneration (charge) by an electric motor.

CITATION LIST

Patent Literature

[Patent Literature 1] Japanese Patent Laid-Open No. 2013-226939

SUMMARY OF INVENTION

Technical Problem

By the way, in the hybrid vehicle, the alternating current generator can be provided as a motor generator that can function not only as a generator, but also as an electric motor that can provide torque to the internal combustion engine, and the motor generator can perform start assist of the internal combustion engine. The "start assist" denotes providing torque to the internal combustion engine to restart the internal combustion engine in an idle state (idling state).

In conventional control of the internal combustion engine, a rotational speed calculated every time a crankshaft rotates 180° is used. One magnet of an N pole and one magnet of an S pole are provided on a peripheral surface of the crankshaft, and the rotational speed is calculated based on a pulse signal detected by a Hall element arranged near the crankshaft. In the present application, the rotational speed calculated in this way will be referred to as an "engine rotational speed".

The engine rotational speed is also used in the hybrid vehicle to figure out the rotational speed of the internal combustion engine when the start assist is performed. However, since a resolution of the engine rotational speed is low, a long time is required to confirm the rotational speed of the internal combustion engine, and there is a problem that a time lag is generated. More specifically, there is conventionally a problem that it is difficult to promptly make a determination regarding the start assist.

Therefore, an object of the present invention is to provide a controlling apparatus and a controlling method of a hybrid vehicle that can promptly make a determination regarding the start assist of a hybrid vehicle.

Solution to Problem

A controlling apparatus according to the present invention is a controlling apparatus of a hybrid vehicle including a motor generator that is mechanically connected to an internal combustion engine and that can generate power in response to rotation of the internal combustion engine and provide torque to the internal combustion engine, the controlling apparatus including:

a rotation information acquiring unit that acquires rotation information of the motor generator with a higher resolution than rotation information of the internal combustion engine; and an assist determining unit that makes a determination regarding start assist by the motor generator based on the rotation information of the motor generator.

Furthermore, in the controlling apparatus, the assist determining unit may judge whether starting of the internal combustion engine is completed and whether a rotational speed of the motor generator is equal to or smaller than an assist permission rotational speed based on the rotation information of the motor generator and permit the start assist when the starting of the internal combustion engine is completed and the rotational speed of the motor generator is equal to or smaller than the assist permission rotational speed.

Furthermore, in the controlling apparatus, the assist determining unit may permit the start assist when a throttle opening corresponding to an accelerator operation of a driver is equal to or greater than an assist permission lower limit.

Furthermore, in the controlling apparatus, the assist determining unit may cancel the permission of the start assist when the motor generator is in an abnormal state or when a brake control is performed.

Furthermore, in the controlling apparatus, the assist determining unit may judge whether the starting of the internal combustion engine is completed and whether the rotational speed of the motor generator is equal to or smaller than the assist permission rotational speed based on the rotation information of the motor generator and accept the start assist when the starting of the internal combustion engine is completed, the rotational speed of the motor generator is equal to or smaller than the assist permission rotational speed, and the throttle opening corresponding to the accelerator operation of the driver is smaller than the assist permission lower limit.

Furthermore, the controlling apparatus may further include a torque controlling unit that increases the torque provided to the internal combustion engine by the motor generator at a rate equal to or smaller than a prescribed time rate of change when the start assist is permitted.

Furthermore, in the controlling apparatus,
the torque controlling unit may increase, in a stepwise manner, the torque provided to the internal combustion engine by the motor generator.

Furthermore, in the controlling apparatus,
the torque controlling unit may change an amount of increase in the torque based on the rotation information of the motor generator.

Furthermore, in the controlling apparatus,
the motor generator may cause the internal combustion engine to start to rotate when the hybrid vehicle departs.

Furthermore, in the controlling apparatus,
the hybrid vehicle may be a hybrid two-wheeled vehicle.

A controlling method of a hybrid vehicle according to the present invention is
a controlling method of a hybrid vehicle including a motor generator that is mechanically connected to an internal combustion engine and that can generate power in response to rotation of the internal combustion engine and provide torque to the internal combustion engine, the controlling method including:

acquiring, by a rotation information acquiring unit, rotation information of the motor generator with a higher resolution than rotation information of the internal combustion engine; and making a determination, by an assist determining unit, regarding start assist by the motor generator based on the rotation information of the motor generator.

Advantageous Effect of Invention

In the present invention, the rotation information of the motor generator with a higher resolution than the rotation information of the internal combustion engine is acquired, and the determination regarding the start assist is made based on the rotation information of the motor generator. As a result, according to the present invention, the determination regarding the start assist of the hybrid vehicle can be promptly made.

DESCRIPTION OF EMBODIMENT

Hereinafter, an embodiment of the present invention will be described with reference to the drawings.

First, a schematic configuration of a hybrid vehicle 30 according to the embodiment will be described with reference to FIGS. 1 to 3.

The hybrid vehicle 30 is a hybrid-type two-wheeled vehicle (hybrid two-wheeled vehicle) including two power sources which are an internal combustion engine and an electric motor. Note that the hybrid vehicle 30 is not limited to the two-wheeled vehicle and may be another hybrid-type vehicle (such as a four-wheeled vehicle).

Figure 1:
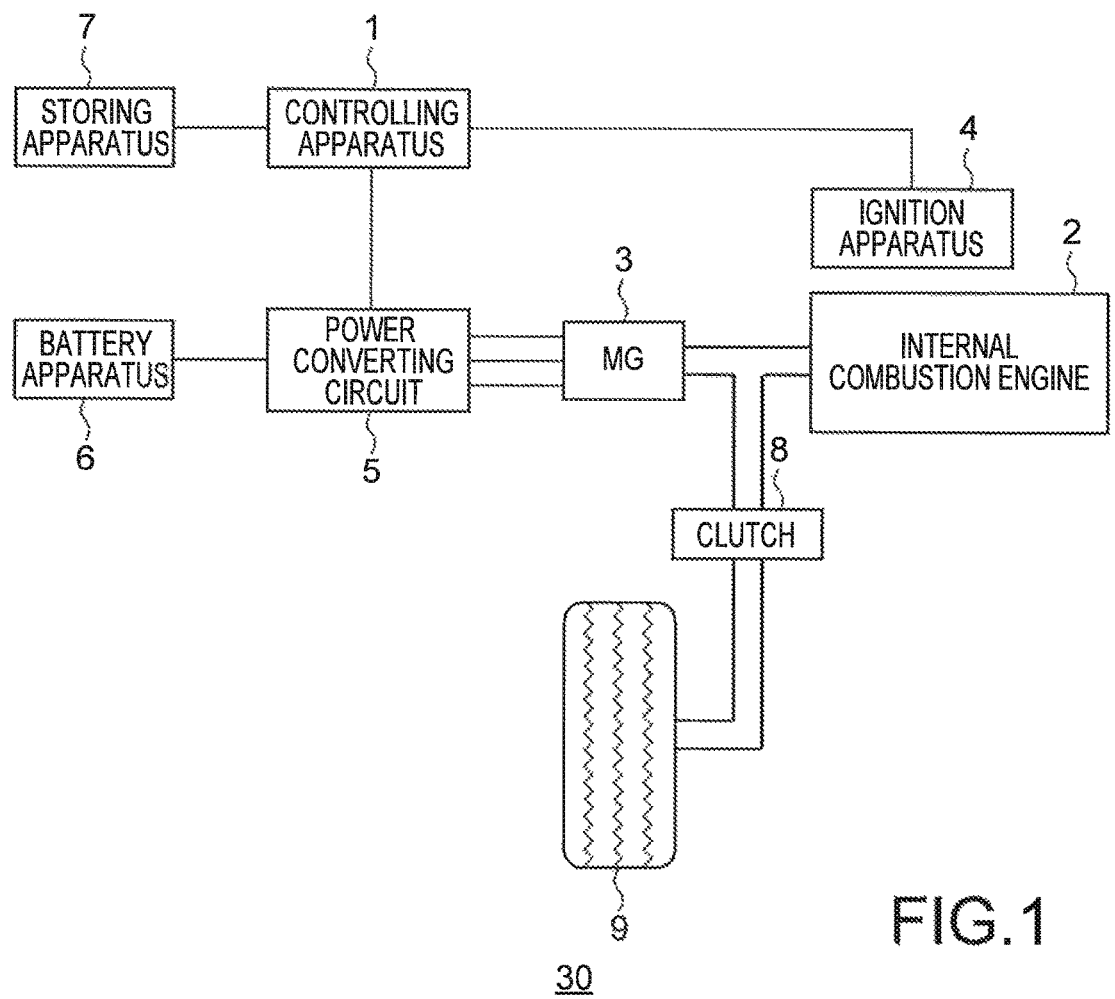
FIG. 1 is a diagram showing a schematic configuration of a hybrid vehicle 30 according to an embodiment.

As shown in FIG. 1, the hybrid vehicle 30 includes a controlling apparatus 1, an internal combustion engine (engine) 2, a motor generator (Motor Generator: MG) 3, an ignition apparatus 4, a power converting circuit 5, a battery apparatus 6, a storing apparatus 7, a clutch 8, and a wheel 9. The wheel 9 of FIG. 1 represents a rear wheel of the hybrid two-wheeled vehicle.

The controlling apparatus 1 is configured to make a determination regarding start assist by the motor generator 3. Furthermore, the controlling apparatus 1 controls torque (hereinafter, also simply referred to as "motor torque") provided to the internal combustion engine 2 by the motor generator 3. Details of the controlling apparatus 1 will be described later. Note that the controlling apparatus 1 may be provided as an ECU (Electronic Control Unit) that controls the entire hybrid vehicle 30.

The internal combustion engine 2 uses pressure when a fuel gas (air-fuel mixture) is burned and outputs rotational driving force to the wheel 9 through the clutch 8. A crankshaft 21 of the internal combustion engine 2 changes up-and-down motion of pistons (not shown) into rotary motion.

Note that the type of the internal combustion engine 2 is not particularly limited, and for example, the internal combustion engine 2 may be a 4-stroke engine or a 2-stroke engine. Furthermore, an electronic throttle valve (not shown) may be disposed on an intake path of the internal combustion engine 2. In this case, an accelerator position sensor reads a throttle opening set by an accelerator (grip) operation of a driver (rider) and transmits the throttle opening as an electrical signal to the controlling apparatus 1. Subsequently, the controlling apparatus 1 calculates a throttle opening based on the received set throttle opening and transmits a command to adjusting means (such as a throttle motor) of the throttle opening.

The motor generator 3 is mechanically connected to the internal combustion engine 2 as shown in FIG. 1. In the present embodiment, the motor generator 3 is based on an alternating current generator (ACG) and is connected to the crankshaft of the internal combustion engine 2 all the time without a clutch.

Figure 2:
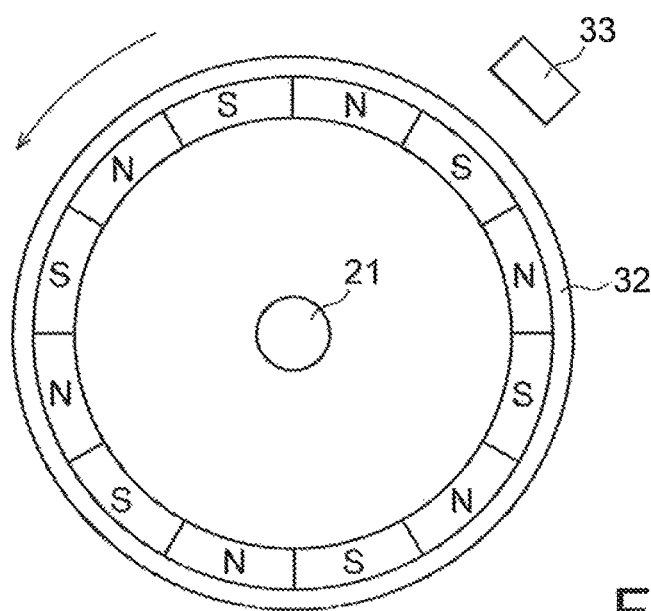
FIG. 2 is a diagram showing a schematic configuration of a motor generator 3 of the hybrid vehicle 30.
Figure 3:
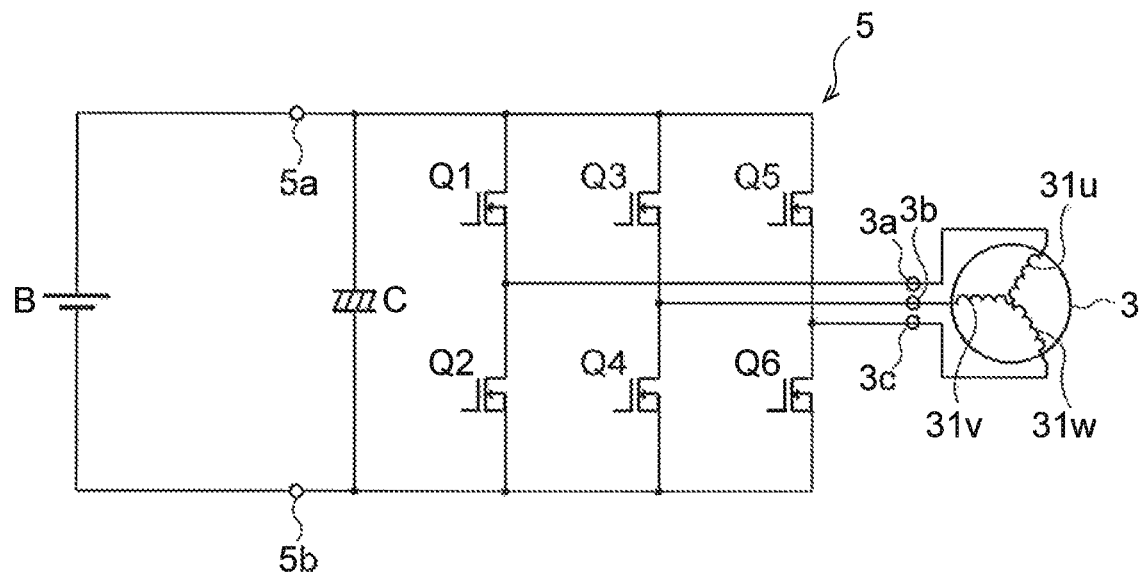
FIG. 3 is a diagram showing a schematic configuration of a power converting circuit 5 of the hybrid vehicle 30.

As shown in FIGS. 2 and 3, the motor generator 3 includes: stator coils $31u$, $31v$, and $31w$ attached to a crankcase (not shown) of the internal combustion engine 2; a flywheel (magnet rotor) 32 attached to an end portion of the crankshaft 21 of the internal combustion engine 2; and a position detecting unit 33 provided on the flywheel 32. Note that the stator coils $31u$, $31v$, and $31w$ are not illustrated in FIG. 2. Furthermore, the arrangement position of the position detecting unit 33 is not limited to the position shown in FIG. 2.

As shown in FIG. 2, magnets of an N pole and magnets of an S pole are alternatively attached to the inside of the flywheel 32. In the present embodiment, a total of twelve magnets are attached at 30° intervals. Note that the number of magnets is not limited to twelve. The position detecting unit 33 transmits a pulse signal to the controlling apparatus 1 every time the flywheel 32 rotates 30°. The position detecting unit 33 is, for example, a Hall element. The Hall element is preferably provided for each phase of a U phase, a V phase, and a W phase. The pulse signal detected by the Hall element is transmitted to the controlling apparatus 1.

The controlling apparatus 1 calculates a rotational speed of the motor generator 3 (flywheel 32) based on the pulse signal received from the position detecting unit 33. A relatively large number of magnets can be provided on the flywheel 32 with a larger diameter than the crankshaft 21. Therefore, the controlling apparatus 1 can use the signal of the position detecting unit 33 to calculate the rotational speed at a higher resolution than a conventional engine rotational speed. Since the flywheel 32 is connected to the crankshaft 21 all the time, the rotational speed of the flywheel 32 (motor generator 3) is always the same as the rotational speed of the crankshaft 21 (internal combustion engine 2). Therefore, the rotational speed of the motor generator 3 calculated by using the position detecting unit 33 can be used as the rotational speed of the internal combustion engine 2.

As the flywheel 32 of the motor generator 3 rotates in synchronization with the crankshaft 21 of the internal combustion engine 2, alternating current power of three phases is output from the stator coils 31$u$, 31$v$, and 31$w$. On the other hand, by applying three-phase alternating current to the stator coils 31$u$, 31$v$, and 31$w$, torque is provided to the internal combustion engine 2 through the flywheel 32.

As described above, the motor generator 3 is configured to be capable of generating power in response to the rotation of the internal combustion engine 2 and capable of providing torque to the internal combustion engine 2. More specifically, when the motor generator 3 is rotated and driven by the internal combustion engine 2, the motor generator 3 generates power and outputs three-phase alternating current power to the power converting circuit 5. Then, the power converting circuit 5 converts the three-phase alternating current power to direct current power to charge a battery B (direct current power supply) included in the battery apparatus 6. On the other hand, when torque is to be provided to the internal combustion engine 2, the motor generator 3 rotates based on the three-phase alternating current power output from the power converting circuit 5 to assist the internal combustion engine 2.

Note that the motor generator 3 may also function as a starting motor (self-starter) that causes the internal combustion engine 2 to start to rotate when the hybrid vehicle 30 departs.

The ignition apparatus 4 receives a control signal from the controlling apparatus 1 and ignites, at an appropriate timing, the air-fuel mixture compressed in the cylinder of the internal combustion engine 2. Note that the kind of the ignition apparatus 4 is not particularly limited, and the ignition apparatus 4 may be a CDI (Capacitive Discharge Ignition) type or a full transistor type.

When the motor generator 3 assists the internal combustion engine 2, the power converting circuit 5 converts the direct current power output from the battery B of the battery apparatus 6 into alternating current power of three phases and supplies the alternating current power of three phases to the motor generator 3 to drive the motor generator 3. On the other hand, when the motor generator 3 generates power, the power converting circuit 5 converts the three-phase alternating current power supplied from the motor generator 3 into direct current power and outputs the direct current power to the battery B of the battery apparatus 6.

As shown in FIG. 3, the power converting circuit 5 includes a three-phase full-bridge circuit. Semiconductor switches Q1, Q3, and Q5 are high side switches, and semiconductor switches Q2, Q4, and Q6 are low side switches. Control terminals of the semiconductor switches Q1 to Q6 are electrically connected to the controlling apparatus 1. Note that the semiconductor switches Q1 to Q6 are, for example, MOSFETs, IGBTs, or the like. A smoothing capacitor C is provided between a power supply terminal 5$a$ and a power supply terminal 5$b$.

The semiconductor switch Q1 is connected between the power supply terminal 5$a$, to which a positive electrode of the battery B is connected, and a terminal 3$a$ of the motor generator 3. Similarly, the semiconductor switch Q3 is connected between the power supply terminal 5$a$, to which the positive electrode of the battery B is connected, and a terminal 3$b$ of the motor generator 3.

The semiconductor switch Q5 is connected between the power supply terminal 5$a$, to which the positive electrode of the battery B is connected, and a terminal 3$c$ of the motor generator 3.

The semiconductor switch Q2 is connected between the power supply terminal 5$b$, to which a negative electrode of the battery B is connected, and the terminal 3$a$ of the motor generator 3. Similarly, the semiconductor switch Q4 is connected between the power supply terminal 5$b$, to which the negative electrode of the battery B is connected, and the terminal 3$b$ of the motor generator 3. The semiconductor switch Q6 is connected between the power supply terminal 5$b$, to which the negative electrode of the battery B is connected, and the terminal 3$c$ of the motor generator 3. Note that the terminal 3$a$ is a terminal of the U phase, the terminal 3$b$ is a terminal of the V phase, and the terminal 3$c$ is a terminal of the W phase.

The battery apparatus 6 includes the chargeable and dischargeable battery B and a battery managing unit (Battery Management Unit: BMU) (not shown) that manages the battery B. The battery B can accumulate power generated by the motor generator 3 and can supply the power to the motor generator 3. The type of the battery B is not particularly limited, and for example, the battery B is a lithium ion battery. The battery managing unit transmits information (battery information) related to the voltage of the battery B and the state of the battery B to the controlling apparatus 1.

The storing apparatus 7 stores information used by the controlling apparatus 1 (such as various maps and operation programs for controlling the internal combustion engine 2 and the motor generator 3). The storing apparatus 7 is constituted by, for example, a non-volatile semiconductor memory.

Figure 4:
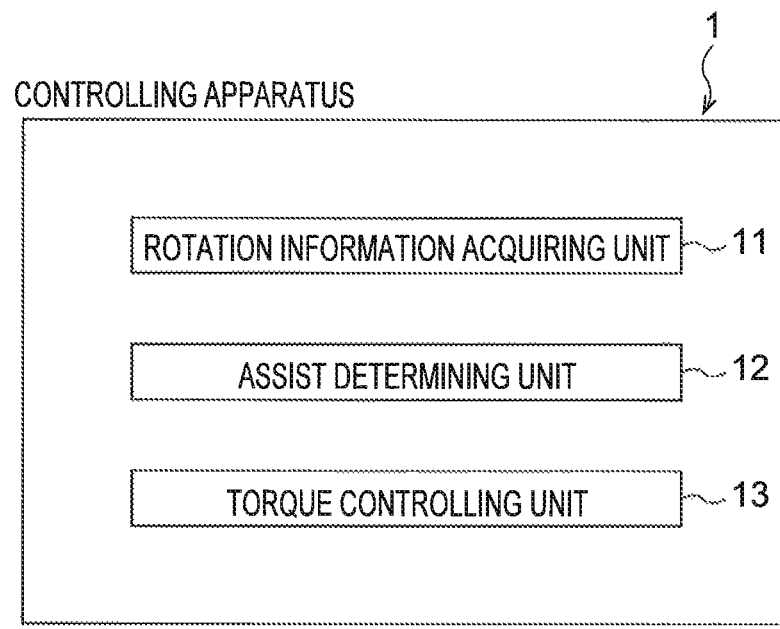
FIG. 4 is a functional block diagram of the controlling apparatus 1 according to the embodiment.

Next, details of the controlling apparatus 1 will be described with reference to FIG. 4.

The controlling apparatus 1 includes a rotation information acquiring unit 11, an assist determining unit 12, and a torque controlling unit 13 as shown in FIG. 14.

The rotation information acquiring unit 11 acquires rotation information of the motor generator 3 with a higher resolution than rotation information of the internal combustion engine 2. Here, the "rotation information" is the rotational speed or the number of rotations. In the present embodiment, the rotation information acquiring unit 11 acquires the rotational speed of the motor generator 3 calculated based on the pulse signal received from the position detecting unit 33. Note that the rotation information acquiring unit 11 itself may calculate the rotational speed of the motor generator 3 based on the pulse signal of the position detecting unit 33. Since the flywheel 32 is mechanically connected to the crankshaft 21 as described above, the rotational speed of the motor generator 3 (flywheel 32)

acquired by the rotation information acquiring unit 11 is equal to the rotational speed of the internal combustion engine 2 (crankshaft 21).

The assist determining unit 12 makes a determination regarding start assist by the motor generator 3 based on the rotation information of the motor generator 3 acquired by the rotation information acquiring unit 11. An example of a determination flow will be described later by using FIG. 7. Since the determination regarding the start assist is made based on the rotational speed of the motor generator 3 with a higher resolution than the rotational speed (engine rotational speed) of the internal combustion engine 2, the assist determining unit 12 can promptly make the determination regarding the start assist.

Next, details of the determination regarding the start assist will be described.

The assist determining unit 12 judges whether starting of the internal combustion engine 2 is completed and whether the rotational speed of the motor generator 3 is equal to or smaller than an assist permission rotational speed based on the rotation information of the motor generator 3. Then, when the starting of the internal combustion engine 2 is completed (condition 1) and the rotational speed of the motor generator 3 is equal to or smaller than the assist permission rotational speed (condition) 2, the assist determining unit 12 permits the start assist. Furthermore, the assist determining unit 12 may permit the start assist when the throttle opening corresponding to the accelerator operation of the driver is equal to or greater than an assist permission lower limit, in addition to the condition 1 and the condition 2.

Note that the assist determining unit 12 cancels the permission of the start assist when the motor generator 3 is in an abnormal state or when brake control is performed. This can prevent execution of the start assist under a situation of a malfunction of the motor generator 3 or a brake operation. The "brake control" here denotes causing the motor generator 3 (for example, motor generator based on alternating current generator ACG) to generate negative motor torque to apply the brake or putting the motor generator 3 into a short circuit state to apply the brake. The "short circuit state" denotes a state in which one of the high side switches (semiconductor switches Q1, Q3, and Q5) and the low side switches (semiconductor switches Q2, Q4, and Q6) is turned on, and the other is turned off.

Furthermore, the assist determining unit 12 accepts the start assist when the starting of the internal combustion engine 2 is completed, the rotational speed of the motor generator 3 is equal to or smaller than the assist permission rotational speed, and the throttle opening corresponding to the accelerator operation of the driver is smaller than the assist permission lower limit. When the start assist is accepted, the start assist is immediately permitted once the throttle opening becomes equal to or greater than the assist permission lower limit.

The torque controlling unit 13 controls the torque (motor torque) provided to the internal combustion engine 2 by the motor generator 3. More specifically, the torque controlling unit 13 calculates an application timing and a duty ratio of a PWM signal output to the power converting circuit 5 based on required motor torque and outputs the PWM signal to the semiconductor switches Q1 to Q6. Note that the application timing denotes advance (advance angle) or retardation (retard angle) of the phase of the PWM signal relative to a motor electrical angle. The angle is an advance angle when the motor generator 3 performs an assist operation, and the angle is a retard angle when the motor generator 3 performs a power generation operation.

The torque controlling unit 13 gradually increases the motor torque when the start assist is permitted. In other words, when the start assist is permitted, the torque controlling unit 13 increases the torque provided to the internal combustion engine 2 by the motor generator 3 at a rate equal to or smaller than a prescribed time rate of change. As a result, the start assist can be performed without making the driver uncomfortable.

Figure 5:
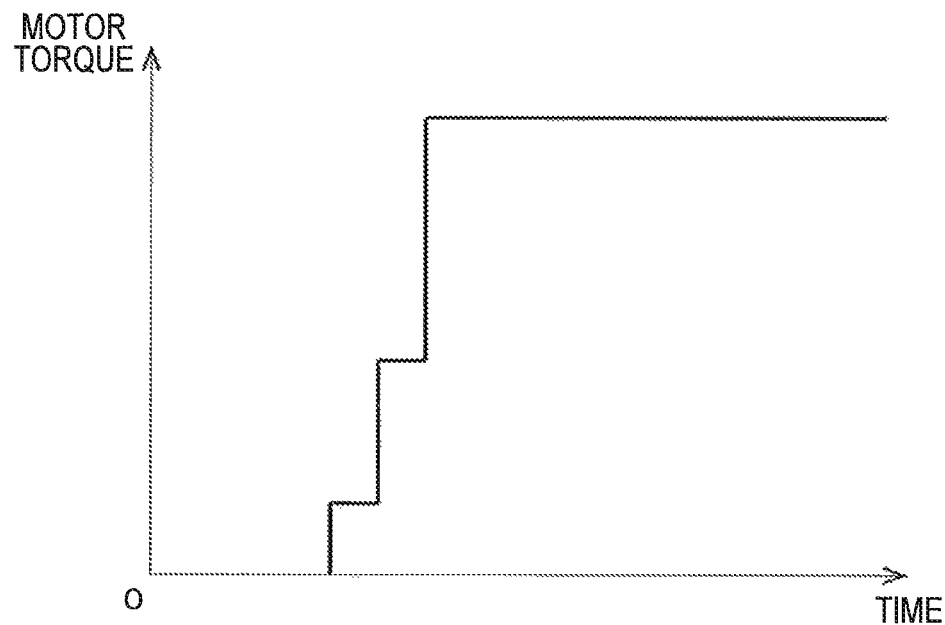
FIG. 5 is a graph showing an example of motor torque control by the controlling apparatus 1.

Note that the torque controlling unit 13 may increase, in a stepwise manner, the torque provided to the internal combustion engine 2 by the motor generator 3 as shown in FIG. 5. In this case, the torque controlling unit 13 may change an amount of increase in motor torque based on the rotation information of the motor generator 3. For example, a larger amount of increase in motor torque may be set for a higher rotational speed of the motor generator 3 as shown in FIG. 5. As a result, smooth start assist can be performed.

As described, in the controlling apparatus 1 according to the present embodiment, the rotation information of the motor generator 3 (flywheel 32) with a higher resolution than the rotation information of the internal combustion engine 2 (crankshaft 21) is acquired, and the determination regarding the start assist is made based on the rotation information. By using the rotation information with a high resolution, the rotational speed of the internal combustion engine 2 can be quickly confirmed to make the determination regarding the start assist. Therefore, according to the present embodiment, the determination regarding the start assist of the hybrid vehicle 30 can be promptly made.

Figure 6:
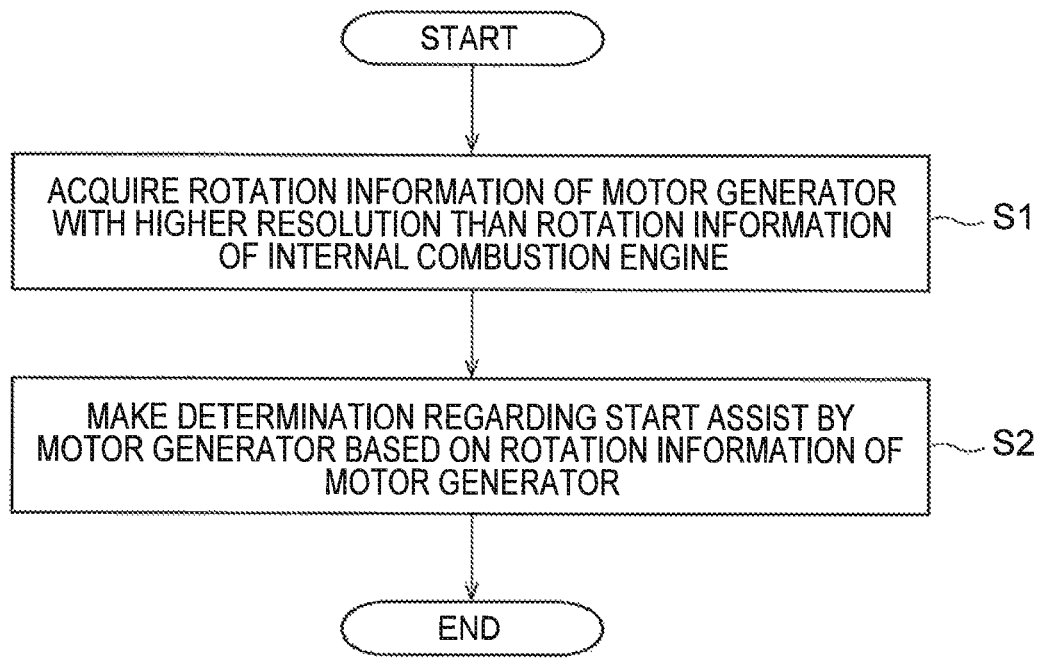
FIG. 6 is a flow chart showing a controlling method according to the embodiment.
Figure 7:
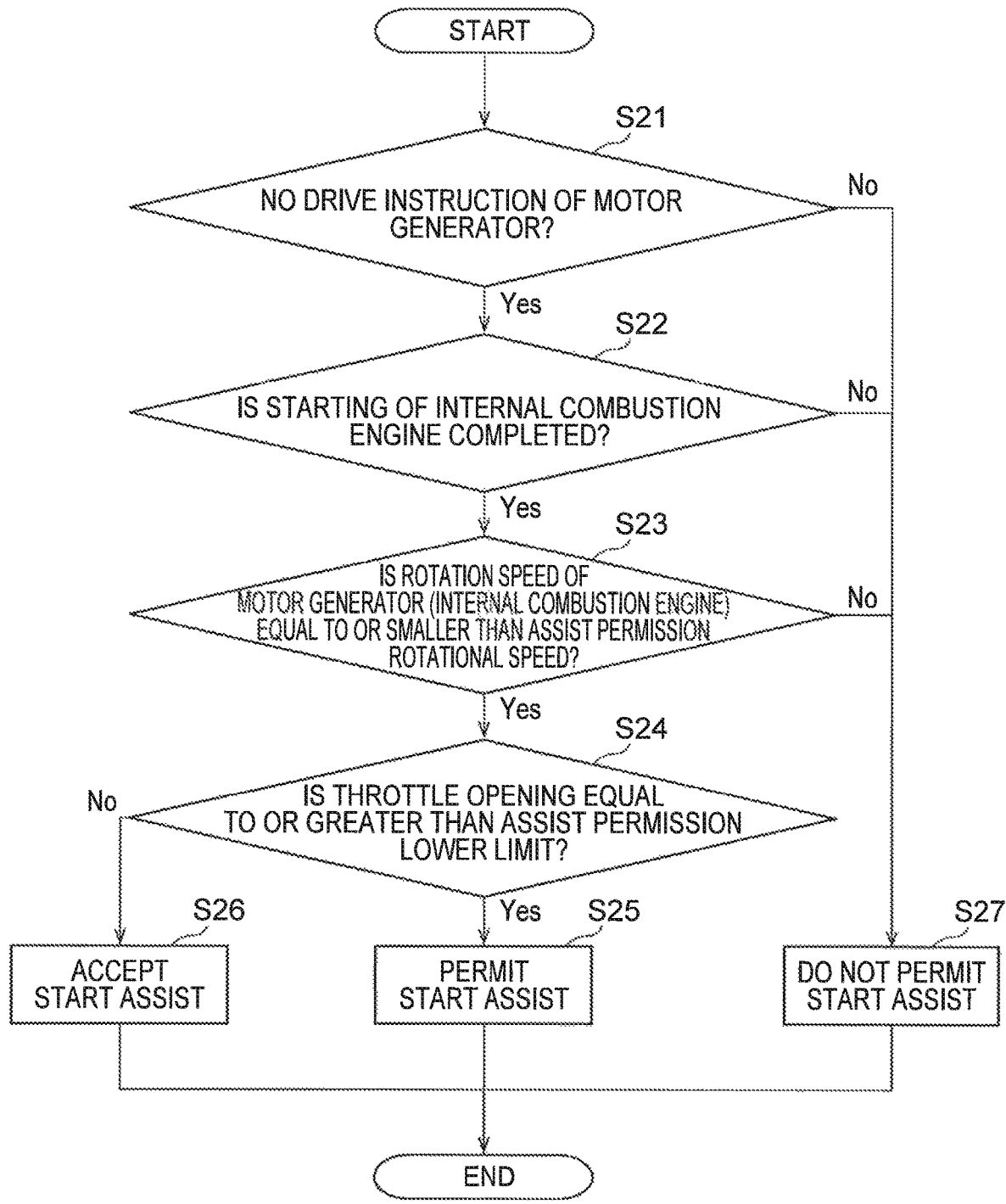
FIG. 7 is a flow chart showing an example of a determining method regarding a start assist.

Next, a controlling method of the hybrid vehicle 30 according to the present embodiment will be described with reference to flow charts of FIGS. 6 and 7.

First, the rotation information acquiring unit 11 acquires the rotation information of the motor generator 3 (flywheel 32) with a higher resolution than the rotation information of the internal combustion engine 2 (crankshaft 21) (step S1).

After the rotation information of the motor generator 3 is acquired, the assist determining unit 12 makes a determination regarding the start assist by the motor generator 3 based on the rotation information (step S2). In the present embodiment, the determination regarding the start assist is made along the flow chart of FIG. 7 as follows.

First, the assist determining unit 12 judges whether there is a drive instruction of the motor generator 3 (step S21). If there is no drive instruction (S21; Yes), the assist determining unit 12 proceeds to step S22. On the other hand, if there is a drive instruction (S21; No), the assist determining unit 12 prioritizes the drive instruction and does not permit the start assist (step S27).

If there is no drive instruction of the motor generator 3 (S21; Yes), the assist determining unit 12 judges whether the starting of the internal combustion engine 2 is completed (step S22). Specifically, when the rotational speed indicated in the rotation information acquired in step S1 is equal to or greater than a prescribed threshold (internal combustion engine starting completion rotational speed), the assist determining unit 12 judges that the starting of the internal combustion engine 2 is completed. If the starting is completed (S22; Yes), the assist determining unit 12 proceeds to step S23. On the other hand, if the starting is not completed (S22; No), the assist determining unit 12 does not permit the start assist (step S27).

If the starting of the internal combustion engine 2 is completed (S22; Yes), the assist determining unit 12 judges whether the rotational speed of the motor generator 3

(internal combustion engine 2) is equal to or smaller than the assist permission lower limit (step S23). If the rotational speed of the motor generator 3 is equal to or smaller than the assist permission lower limit (S23; Yes), the assist determining unit 12 proceeds to step S24. On the other hand, if the rotational speed of the motor generator 3 is greater than the assist permission lower limit (S23; No), the assist determining unit 12 does not permit the start assist (step S27).

If the rotational speed of the motor generator 3 (internal combustion engine 2) is equal to or smaller than the assist permission lower limit (S23; Yes), the assist determining unit 12 judges whether the throttle opening corresponding to the accelerator operation of the driver is equal to or greater than the assist permission lower limit (step S24). If the throttle opening is equal to or greater than the assist permission lower limit (S24; Yes), the assist determining unit 12 permits the start assist (step S25). Once the start assist is permitted, the start assist is executed as long as there is no prohibition factor, such as an abnormality of the motor generator 3 and brake control. On the other hand, if the throttle opening is smaller than the assist permission lower limit (S24; No), the assist determining unit 12 accepts the start assist (step S26). Once the start assist is accepted, the start assist is executed as long as there is no prohibition factor when the throttle opening becomes equal to or greater than the assist permission lower limit.

As described above, in the controlling method according to the present embodiment, the rotation information of the motor generator 3 with a higher resolution than the rotation information (engine rotational speed) of the internal combustion engine 2 is acquired, and the acquired rotational speed of the motor generator 3 is used in the judgement of step S22 and step S23. In this way, the determination regarding the start assist of the hybrid vehicle 30 can be promptly made. As a result, the time lag of the start assist is shortened, and an advantageous effect can be obtained, such as a reduction in the discomfort of the driver of the hybrid vehicle 30.

Although those skilled in the art may be able to conceive additional advantageous effects and various modifications of the present invention based on the description above, modes of the present invention are not limited to the individual embodiments. Constituent elements across different embodiments may be appropriately combined. Various additions, changes, and partial deletions are possible without departing from the conceptual spirit and scope of the present invention derived from the content provided in the claims and equivalents of the content.

REFERENCE SIGNS LIST 1 controlling apparatus
2 internal combustion engine (engine)
21 crankshaft
3 motor generator
3a, 3b, 3c terminals
4 ignition apparatus
5 power converting circuit
5a, 5b power supply terminals
6 battery apparatus
7 storing apparatus
8 clutch
9 wheel
11 rotation information acquiring unit
12 assist determining unit
13 torque controlling unit
30 hybrid vehicle
31u, 31v, 31w stator coils
32 flywheel
33 position detecting unit
B battery
C smoothing capacitor
Q1 to Q6 semiconductor switches

The invention claimed is:

1. A controlling apparatus of a hybrid vehicle comprising a motor generator that is mechanically connected to an internal combustion engine and that can generate power in response to rotation of the internal combustion engine and provide torque to the internal combustion engine, the controlling apparatus comprising:
   a rotation information acquirer that acquires rotation information of the motor generator with a higher resolution than rotation information of the internal combustion engine; and
   an assist determiner that makes a determination regarding start assist by the motor generator based on the rotation information of the motor generator, wherein
   the assist determiner
   judges whether the starting of the internal combustion engine is completed and whether the rotational speed of the motor generator is equal to or smaller than the assist permission rotational speed based on the rotation information of the motor generator, and
   accepts the start assist when the starting of the internal combustion engine is completed, the rotational speed of the motor generator is equal to or smaller than the assist permission rotational speed, and the throttle opening corresponding to an accelerator operation of a driver is smaller than an assist permission lower limit,
   wherein the controlling apparatus further comprises a torque controller that increases the torque provided to the internal combustion engine by the motor generator at a rate equal to or smaller than a prescribed time rate of change when the start assist is permitted.

2. The controlling apparatus according to claim 1, wherein
   the assist determiner
   judges whether starting of the internal combustion engine is completed and whether a rotational speed of the motor generator is equal to or smaller than an assist permission rotational speed based on the rotation information of the motor generator and
   permits the start assist when the starting of the internal combustion engine is completed and the rotational speed of the motor generator is equal to or smaller than the assist permission rotational speed.

3. The controlling apparatus according to claim 2, wherein
   the assist determiner permits the start assist when the throttle opening corresponding to the accelerator operation of the driver is equal to or greater than the assist permission lower limit.

4. The controlling apparatus according to claim 3, wherein
   the assist determiner cancels the permission of the start assist when the motor generator is in an abnormal state or when a brake control is performed.

5. The controlling apparatus according to claim 1, wherein
   the torque controller increases, in a stepwise manner, the torque provided to the internal combustion engine by the motor generator.

6. The controlling apparatus according to claim 1, wherein
the torque controller changes an amount of increase in the torque based on the rotation information of the motor generator.

7. The controlling apparatus according to claim 1, wherein
the motor generator causes the internal combustion engine to start to rotate when the hybrid vehicle departs.

8. The controlling apparatus according to claim 1, wherein
the hybrid vehicle is a hybrid two-wheeled vehicle.

9. A controlling method of a hybrid vehicle comprising a motor generator that is mechanically connected to an internal combustion engine and that can generate power in response to rotation of the internal combustion engine and provide torque to the internal combustion engine, the controlling method comprising:
acquiring, by a rotation information acquirer of a controlling apparatus, rotation information of the motor generator with a higher resolution than rotation information of the internal combustion engine; and
making a determination, by an assist determiner of the controlling apparatus, regarding start assist by the motor generator based on the rotation information of the motor generator, wherein
the assist determiner
judges whether the starting of the internal combustion engine is completed and whether the rotational speed of the motor generator is equal to or smaller than the assist permission rotational speed based on the rotation information of the motor generator, and
accepts the start assist when the starting of the internal combustion engine is completed, the rotational speed of the motor generator is equal to or smaller than the assist permission rotational speed, and the throttle opening corresponding to an accelerator operation of a driver is smaller than an assist permission lower limit,
wherein the controlling apparatus further comprises a torque controller that increases the torque provided to the internal combustion engine by the motor generator at a rate equal to or smaller than a prescribed time rate of change when the start assist is permitted.

* * * * *